United States Patent
Drane et al.

[11] Patent Number: 6,111,201
[45] Date of Patent: Aug. 29, 2000

[54] CABLE SPLICE CLOSURE

[75] Inventors: Mark R. Drane, Germantown; Camilo H. Jurado, Cordova, both of Tenn.

[73] Assignee: Thomas & Betts International, Inc., Sparks, Nev.

[21] Appl. No.: 09/083,619

[22] Filed: May 22, 1998

Related U.S. Application Data

[60] Provisional application No. 60/047,567, May 22, 1997, abandoned.

[51] Int. Cl.⁷ .................................................. H02G 15/113
[52] U.S. Cl. ............................................................ 174/92
[58] Field of Search ........................... 174/91, 92, 138 F, 174/135, 76; 439/399, 401, 402, 407, 497, 579

[56] References Cited

U.S. PATENT DOCUMENTS

| | | |
|---|---|---|
| 3,147,338 | 9/1964 | Ekvall et al. . |
| 3,183,302 | 5/1965 | Wochner et al. . |
| 3,634,605 | 1/1972 | Dola . |
| 3,715,459 | 2/1973 | Hoffman . |
| 3,875,325 | 4/1975 | Anderson et al. . |
| 4,423,918 | 1/1984 | Filreis et al. . |
| 4,435,612 | 3/1984 | Smith . |
| 4,610,738 | 9/1986 | Jervis . |
| 4,849,580 | 7/1989 | Reuter . |
| 4,909,756 | 3/1990 | Jervis . |
| 5,001,300 | 3/1991 | Messelhi . |
| 5,017,739 | 5/1991 | Hoffman et al. . |
| 5,046,766 | 9/1991 | Lomberty et al. . |
| 5,190,475 | 3/1993 | Dickens ........................... 174/138 F X |
| 5,191,172 | 3/1993 | Garganese ....................... 174/138 F X |
| 5,322,973 | 6/1994 | Dagan . |
| 5,347,084 | 9/1994 | Roney et al. . |
| 5,371,323 | 12/1994 | Schneider et al. . |
| 5,397,859 | 3/1995 | Robertson et al. . |
| 5,562,478 | 10/1996 | Yamamoto .............................. 439/402 |
| 5,569,882 | 10/1996 | Yokoyama et al. . |
| 5,574,257 | 11/1996 | Brauer et al. . |
| 5,594,210 | 1/1997 | Yabe . |
| 5,606,150 | 2/1997 | Radliff et al. . |
| 5,610,370 | 3/1997 | Fremgen et al. . |
| 5,669,778 | 9/1997 | Kramer et al. ...................... 439/399 X |
| 5,714,717 | 2/1998 | Nakagome ................................ 174/91 |

*Primary Examiner*—Kristine Kincaid
*Assistant Examiner*—Chau N. Nguyen
*Attorney, Agent, or Firm*—Hoffman & Baron, LLP

[57] ABSTRACT

A closure for receipt and storage of a plurality of splice connections and encapsulant. The closure includes first and second cooperating shells defining a bounded region and being telescopically engageable with one another. The closure further includes a living hinge for connecting the first and second shells. The hinge extends continuously across at least one side of each of the closures and is located to allow one of such shells to telescope within the other of the shells when the shells are rotated from an open position to a closed position thus providing a encapsulant-displacing force which continuously directs encapsulant within the bounded region away from the living hinge and toward the splice connections contained therein.

18 Claims, 18 Drawing Sheets

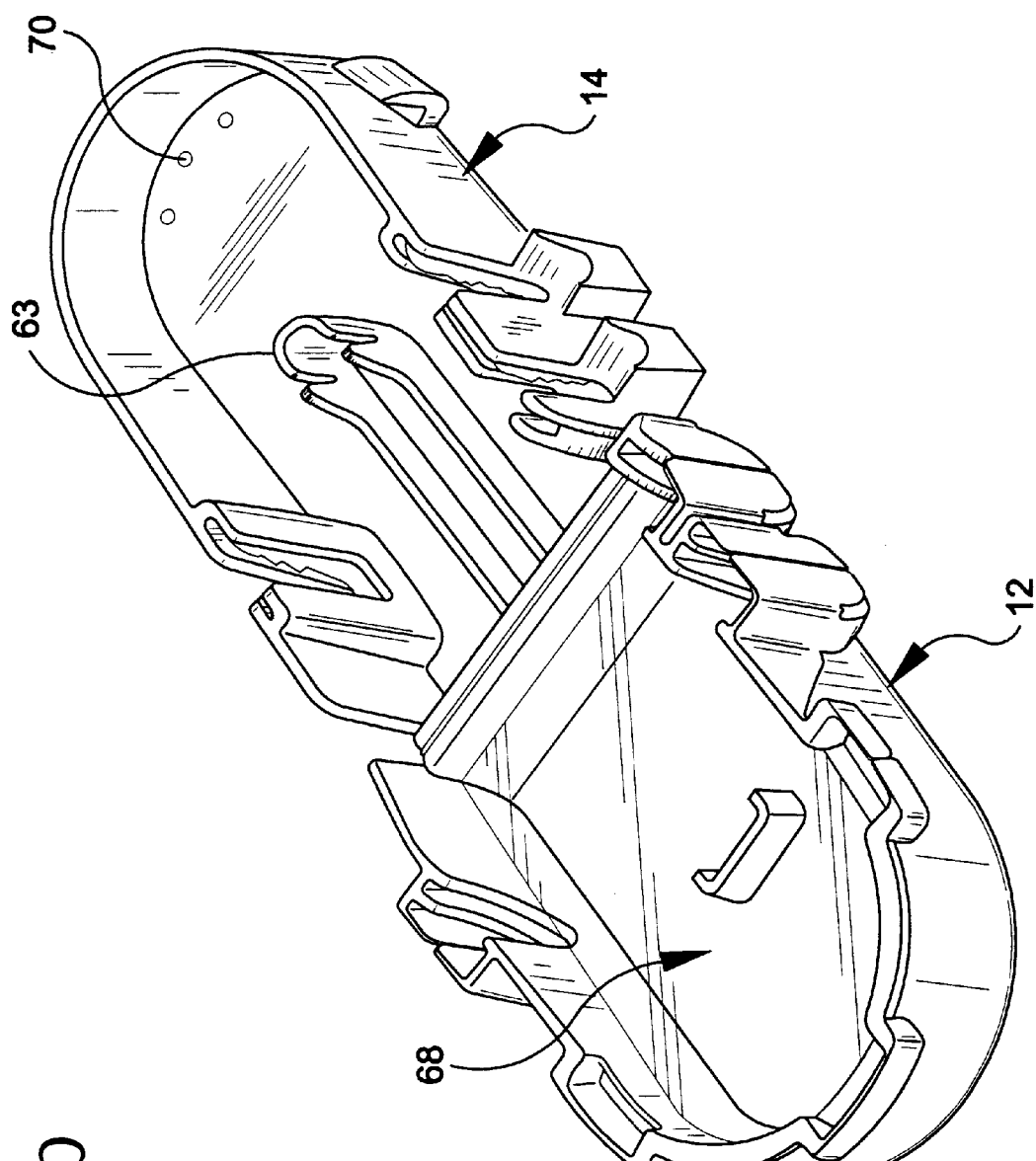

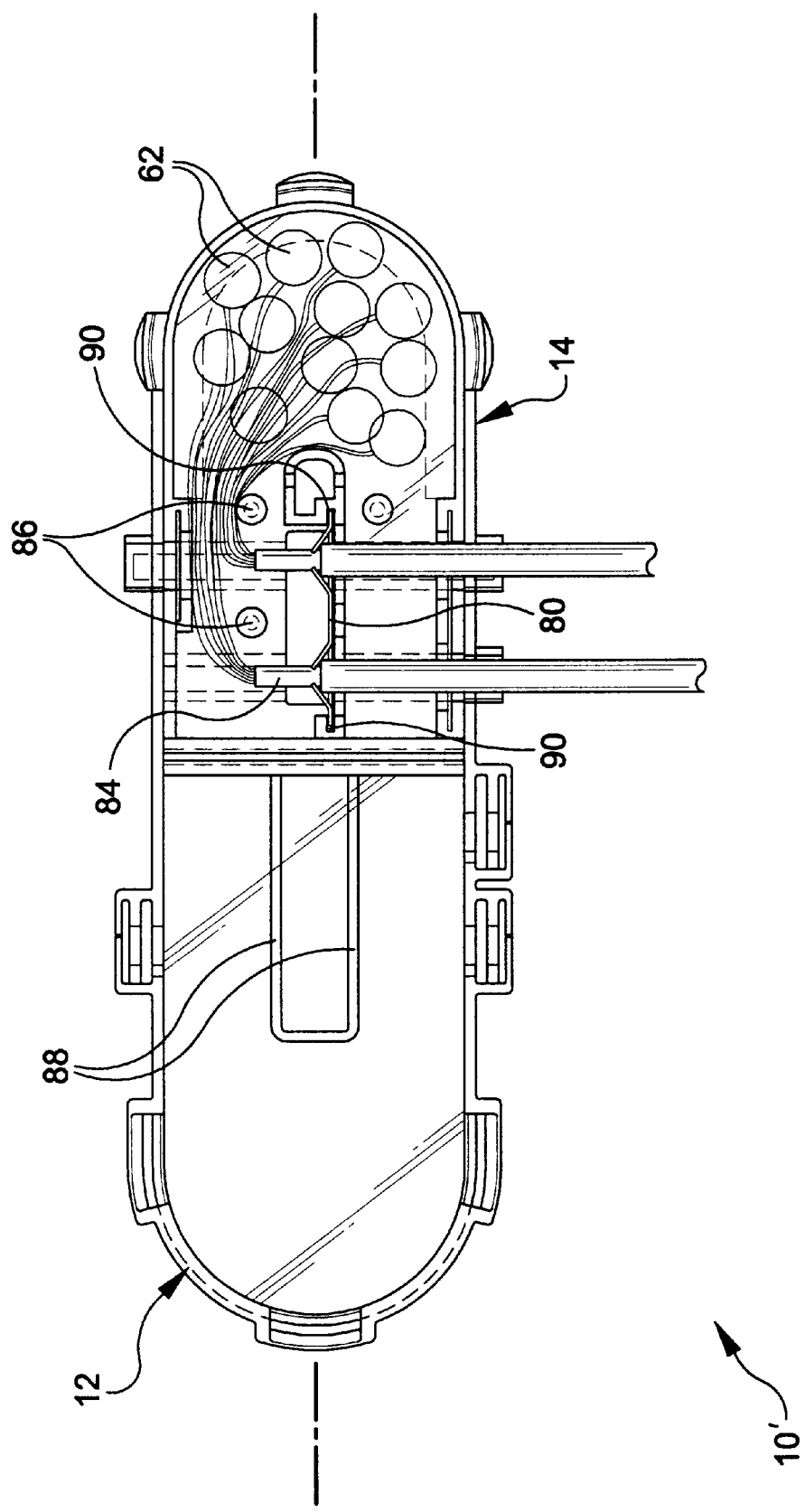

CABLE SPLICE CLOSURE

This application claims priority to U.S. Provisional Application Ser. No. 60/047,567 filed May 22, 1997.

BACKGROUND OF THE INVENTION

The present invention relates to a cable splice closure and, more particularly, to a single piece clam-shell type closure utilizing a living hinge.

Electrical cable made up of a plurality of discrete wires is used in many applications, i.e., telecommunication services. The discrete wires are typically surrounded by a metal shield and an outer protective sheath which protects the discrete wires from moisture and/or other environmental hazards. However, it is often necessary to splice together two sections of electrical cable, for example, to splice long service wires together, to connect service areas and/or to make service connections for individual customers. When splicing two sections of electrical cable together, the metal shield and outer protective sheath must be removed to expose the underlying discrete wires.

Thereafter, the individual wires are spliced together in conventional fashion. The plurality of splice wires are then typically positioned within a cable splice closure, such closure providing protection from moisture and/or other environmental hazards. To further protect the integrity of the splices located within the closure, the closure is filled with an encapsulant which surrounds and protects the spliced wires. Upon closing of the closure, the encapsulant is squeezed around the spliced wires thereby protecting such wires from moisture.

Various prior art closures exist for receipt and storage of spliced wires. A first group of prior art closures are formed with separate top and bottom portions. Two-piece closures are oftentimes less convenient to use in the field, and are less convenient to manufacture. Moreover, a typical two-piece closure is assembled by installing one part directly on top of the other part. As will be appreciated by those skilled in the art, this type of assembly may require the application of significantly large forces to the respective halves of the closure, thus making installation more difficult. More to the point, such a design does not allow for flow control of the encapsulant, i.e., the encapsulant will tend to flow along the path of least resistance, such path not necessarily being in the direction where encapsulant is required.

Another group of prior art closures are formed as one-piece components. The two halves of the closure are pivotable with respect to one another about a living hinge until such halves contact one another to complete the closure. These prior art designs, although facilitating the use of the closure in the field and manufacturing efficiencies, are typically incapable of directing the flow of encapsulant and of providing a encapsulant-displacing force sufficient to force encapsulant contained within the closure into sealing contact with each and every splice connection contained in the closure.

There is therefore a need in the art for a one-piece cable splice closure, such closure utilizing a living hinge whereby installation and manufacture is facilitated. The cable splice closure must be capable of directing the flow of encapsulant and of providing sufficient force to the encapsulant contained in the closure to ensure that such encapsulant is directed to all interior regions of the closure whereby each and every splice contained in the closure is filly encapsulated.

SUMMARY OF THE INVENTION

The present invention, which addresses the needs of the prior art, relates to a closure for receipt and storage of a plurality of splice connections and encapsulant. The closure includes first and second cooperating shells defining a bounded region and being telescopically engageable with one another. The closure further includes a living hinge for connecting the first and second shells. The hinge extends continuously across at least one side of each of the closures thereby defining an axis about which the shell is rotated with respect to one another and providing an encapsulant-flow barrier along the side. The hinge is located to allow one of the shells to telescope within the other of the shells when the shells are rotated from an open position to a closed position thus providing a encapsulant-displacing force which continuously directs encapsulant contained within said bounded region away from said living hinge while simultaneously retaining the encapsulant within the bounded region. The closure further includes at least two passages extending through the shells and communicating with the bounded region whereby electrical cable may be passed therethrough. Finally, the closure includes securing means for retaining the shells in a closed position.

As a result, the present invention provides a one-piece cable splice closure which utilizes a living hinge for ease of installation and manufacture. The cable splice closure, due to the telescoping interaction of the shells, directs the flow of encapsulant contained therewithin toward the forward end of the closure and into engagement with the splice connections contained therein. The cable splice closure of the present invention thus channels the encapsulant into all interior regions of the closure whereby each and every splice contained in the closure is fully encapsulated.

BRIEF DESCRIPTION OF THE DRAWINGS

FIG. 3b is a perspective view of the closure of FIG. 1 containing a paste encapsulant and pressure relief holes;

FIG. 5 is a plan view illustrating a butt splice in an alternative enclosure;

DETAILED DESCRIPTION OF THE INVENTION

Figure 1:
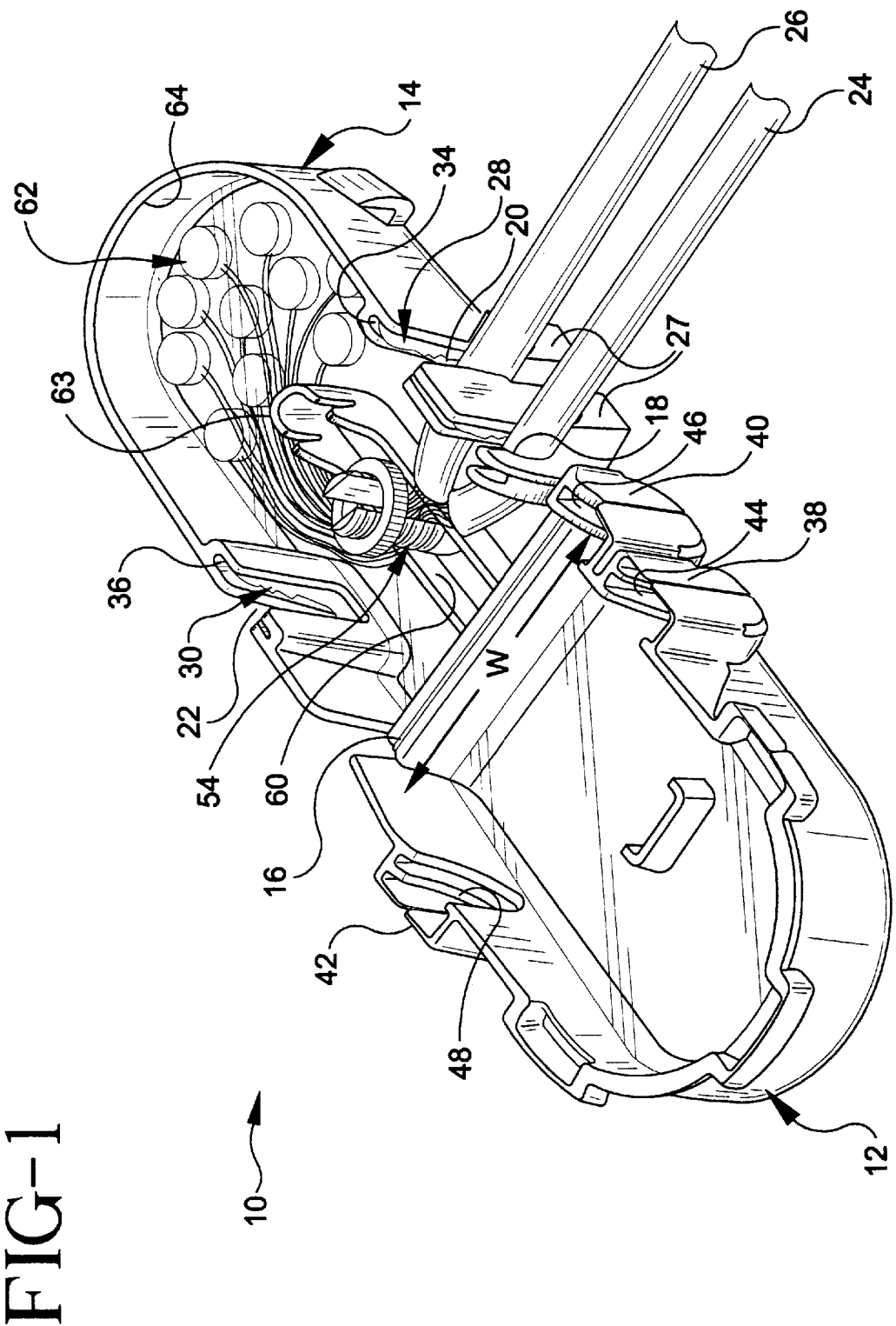
FIG. 1 is a perspective view of the closure of the present invention showing a butt splice positioned within such closure.

Referring to the drawings, a cable splice closure 10 in accordance with the present invention is shown in FIG. 1. Closure 10 includes top shell 12 and bottom shell 14, the halves being rotatable with respect to one another about a living hinge 16. Living hinge 16 is continuous across the width W of the closure. Each of the shells defines an interiorly-located bounded region.

Figure 3A:
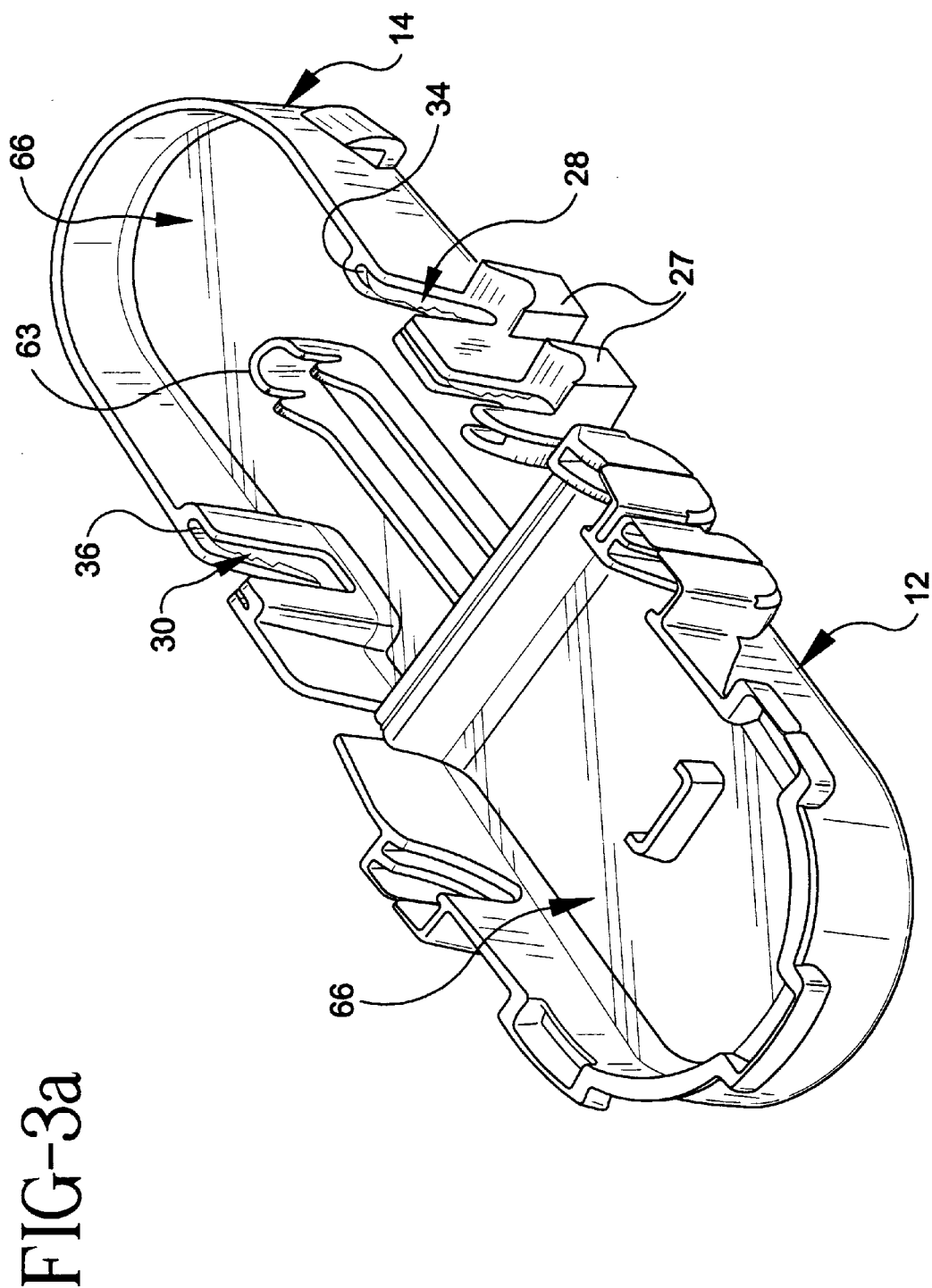
FIG. 3a is a perspective view of the closure of FIG. 1 containing a gel encapsulant.

Bottom shell 14 of closure 10 includes a pair of cable entrances 18, 20 on one side thereof, and a single cable entrance 22 on the opposing side thereof. The cable entrance allow an electrical cable to extend within the shell and thus communicate with the interiorly-located bounded region. As shown in FIG. 1, cable entrances 18 and 20 allow the splicing of cables 24, 26, respectively, via a "butt" splice. Alternatively, one of cable entrances 18 and 20 may be utilized together with the opposing cable entrance 22 to splice two cables via an "in-line" splice. Shell 14 further includes cable support platforms 27 (as best shown in FIG. 3a) which provide additional support and strain relief to the electrical cables proximate the cable entrance.

Figure 1A:
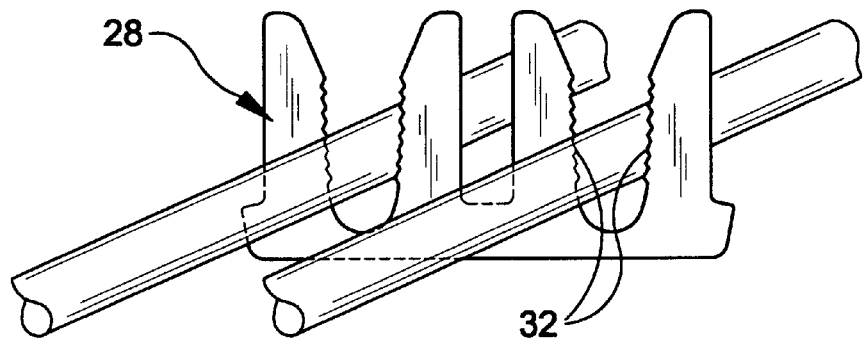
FIG. 1a is an enlarged detail of a dual strain relief clip.
Figure 1B:
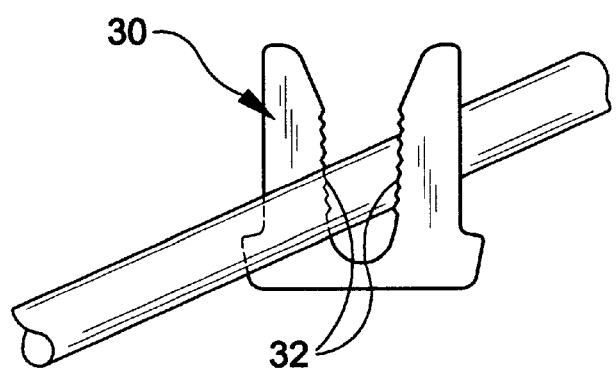
FIG. 1b is an enlarged detail of a single strain relief clip.

To provide adequate strain relief for the cables entering the closure, closure 10 preferably includes strain relief clips 28, 30. As best seen in FIGS. 1a–1b, clips 28 and 30 include a plurality of teeth 32 sized and configured to bite into the cable sheath when the cable is pressed into the cable entrance. As a result, the cable is secured to the closure thereby preventing relative movement with respect thereto. In this regard, closure 10 is preferably formed with receiving cavities 34, 36 for receipt of clips 28, 30, respectively, therein.

Figure 2A:
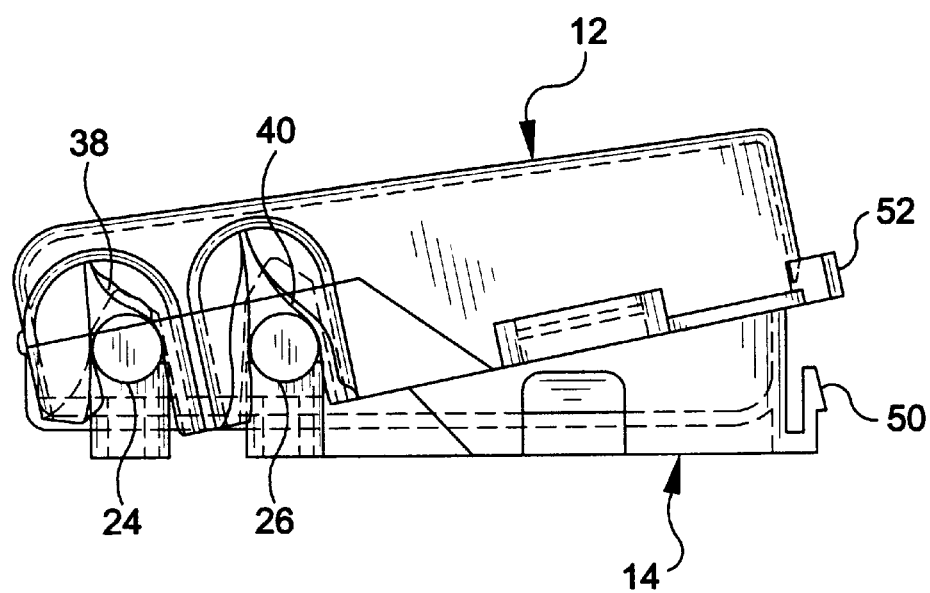
FIG. 2a is a side elevational view of the closure of FIG. 1 in a partially closed position.

Top shell 12 of closure 10 includes curtains 38, 40, 42 which initially cover cable relief passages 44, 46, 48. As will be explained further hereinbelow, the curtains initially hinder any encapsulant contained within the top shell from exiting through the cable relief passages. This is particularly relevant in applications where the closure is prefilled with encapsulant whereby the closure will be shipped and stored with such encapsulant. As the top shell 12 is pivoted about living hinge 16 towards bottom shell 14, the curtains contact the cables secured within the cable entrances of bottom shell 14. As shown in FIG. 2a, curtains 38, 40 spread apart as such curtains contact the cable passing through the associated cable entrance. When utilizing a butt splice (as shown in FIG. 1), curtain 42 located on the other side of the closure serves to close cable entrance 22. Alternatively, the top shell can include cut-away doors which are removed prior to rotation of the shells.

Figure 2B:
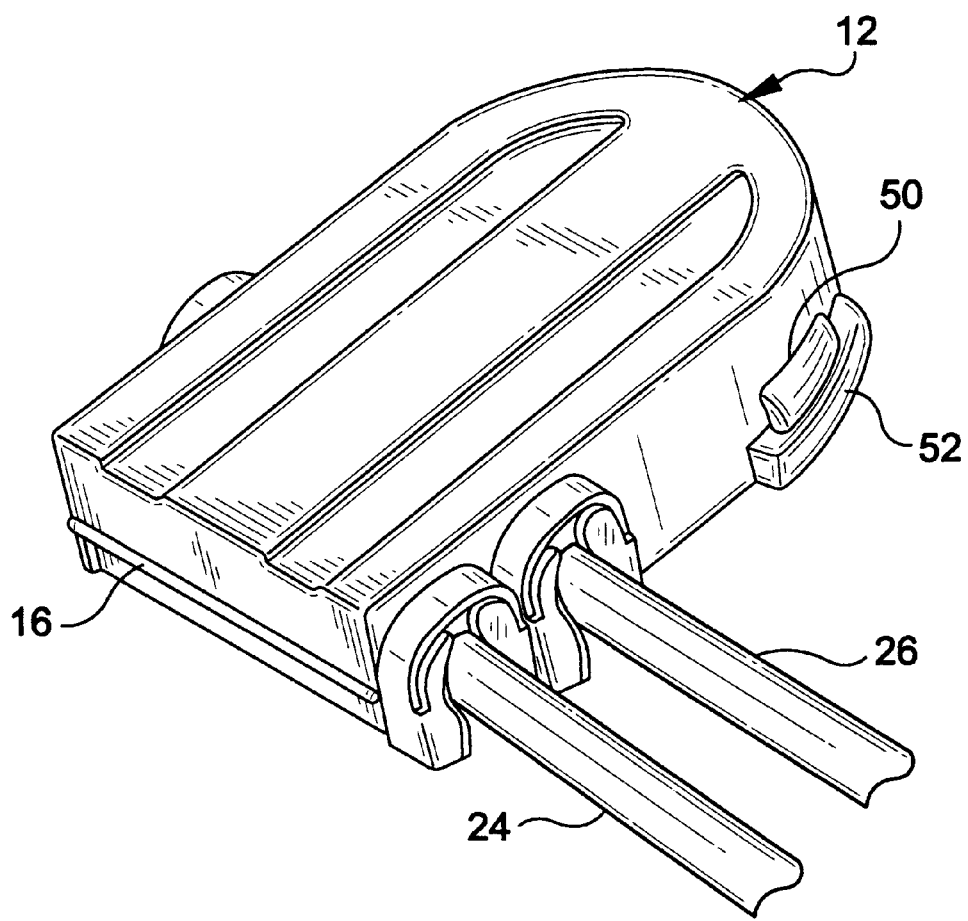
FIG. 2b is a perspective view of the closure of FIG. 1 in a fully closed position.

Once closed, locking tabs 50 formed on bottom shell 14 engage slots 52 formed on top shell 12 to secure the closure in a closed position (see FIG. 2b). This configuration allows an installer to reopen the closure, if necessary. Preferably, the securing means is integrally formed with the shells. Of course, other means of securing the closure in a closed position are contemplated. For example, various locking clips could be utilized, or separate locking members such as bands or pins could be used to secure the closure in its closed position. Alternatively, a ratchet mechanism could be utilized to control closing and reopening of the closure.

Figure 1C:
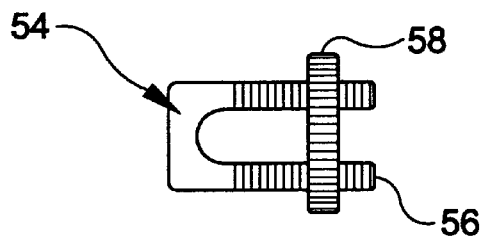
FIG. 1c is an enlarged detail of a split bolt grounding shield connector.

The present invention preferably utilizes a split bolt grounding shield connector 54. Split bolt connector 54 (as best seen in FIG. 1c) includes a threaded bolt 56 and a nut 58 and is utilized to securely retain the grounding shields of the respective cables in electrical contact with one another. To facilitate the location of the split bolt connector 54 within the closure, closure 10 preferably includes a raceway 60. The plurality of splice connections 62 are located at the forward end 64 of the closure (i.e., the end of the closure opposite living hinge 16). Finally, closure 10 may includes a support column 63 sized to contact a portion of the top shell when the closure is closed. This support column thus provides structural support to the closure when such closure is subjected to loading forces during its lifetime.

As will be recognized by those skilled in the art, cable splice closures utilize an encapsulant to fill the closure after the splice connections are positioned therein thereby protecting the individual splices from entry of moisture or other elements into the closure. These encapsulants may include what are commonly referred to as gel encapsulants or paste encapsulants. Referring to FIG. 3a, when a gel encapsulant, i.e., gel encapsulant 66, is utilized, such gel encapsulant is typically provided in both the top and bottom shells of the closure. The closure is typically pre-filled with the gel encapsulant to prevent mixing and messy installations. Referring now to FIG. 3b, when utilizing a paste encapsulant, i.e., paste encapsulant 68, such paste is typically provided in only the top shell. The closure may be prefilled with this paste, or such paste may be mixed in the field, and then poured into the top shell 12 of the closure 10. With the use of a paste encapsulant, the bottom shell of the closure typically includes a plurality of pressure relief holes 70 to facilitate closing of the closure about the spliced cables. This then allows excess encapsulant to extrude out of the closure when such closure is closed.

When the closure is prefilled with encapsulant, such shells are preferably sealed with a pull-away foil cover, or other suitable coverings. Alternatively, a mating cover may be telescoped over one or both shells (while the closure is open) to facilitate storage of the prefilled closure.

Closure 10 is preferably formed as an integrally molded one-piece component. In one preferred embodiment, the closure is formed from an impact-resistant plastic material such as blends of polyproplyene.

One problem typically encountered with prior art closures involves the failure of the encapsulant to completely encapsulate each and every splice and to completely seal the cables within the closure. In this regard, prior art one-piece closures (i.e., those enclosures utilizing a living hinge to join a top and bottom portion of a shell) lack the capability to force encapsulant into every region of the closure. Other prior art closures which utilize separate top and bottom portions are less desirable from a commercial standpoint and, additionally, can be difficult to secure about the spliced cables inasmuch as the top shell of the closure is placed over the bottom shell and pressed directly down thereagainst. In such an arrangement, a sufficiently large force may have to be applied to the closure to close such enclosure. More to the point, it is difficult if not impossible to control the flow of encapsulant within the closure. Thus, upon closing the closure, encapsulant may be forced to travel in a direction away from a splice and/or away from an unfilled interior region of the closure.

In contrast, the novel configuration of the closure of the present invention controls the direction of flow of the encapsulant thereby ensuring that each splice is fully encapsulated with encapsulant and that all interior regions of the closure are filled with encapsulant upon closing of the closure. As will be discussed further hereinbelow, the novel closure of the present invention accomplishes flow control of the encapsulant through the rotational telescoping engagement of the shells of the closure along the entire length thereof. Thus, closure 10 ensures that the encapsulant contained therein is continuously urged forward as the halves of the closure are rotated about living hinge 16. This is accomplished in a one-piece closure, which as mentioned above facilitates field installation and is also desirable from a manufacturing standpoint. Finally, the complete telescoping of the respective shells limits the amount of encapsulant required within the closure by decreasing the resultant interior volume of the closure.

Figure 4A:
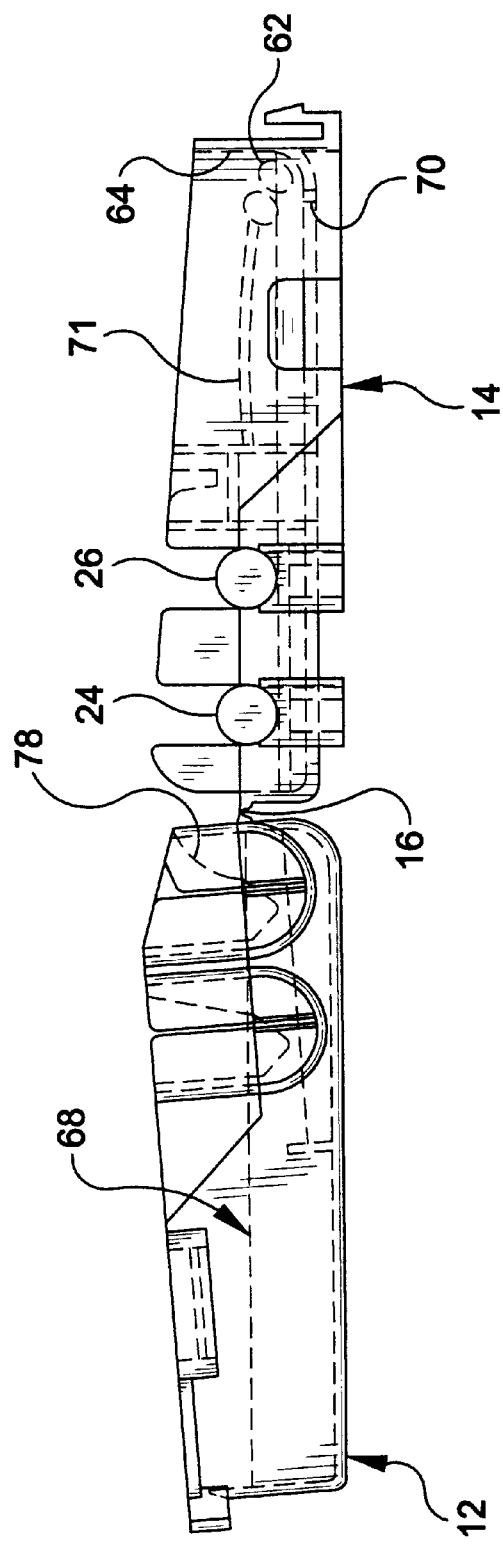
FIG. 4a is a side elevational view of the closure of the present invention in its open position and prefilled with a paste encapsulant.
Figure 4B:
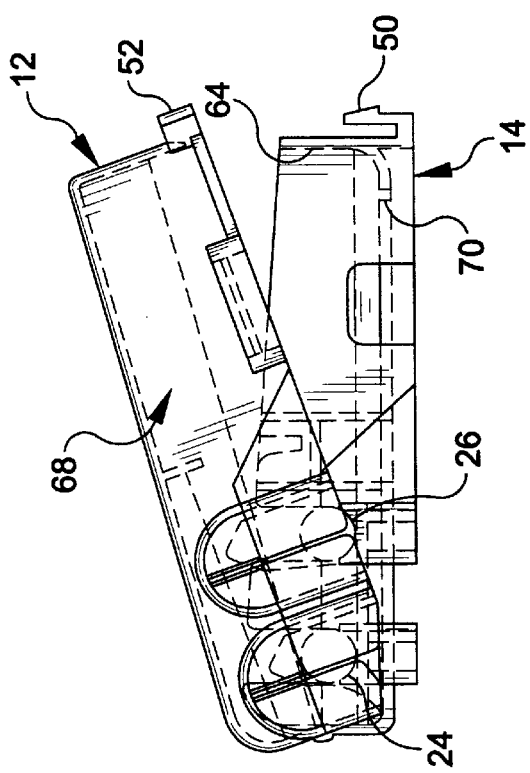
FIG. 4b is a side elevational view of the closure of FIG. 4a in a partially closed condition.

Referring now to FIGS. 4a–4b, as upper shell 12 is rotated clockwise about living hinge 16 from an open position to a closed position, an encapsulant-displacing force is created which force fills the case by urging the encapsulant 68 forward toward the forward end 64 of the closure where the splice connections 62 are located. Inasmuch as the splice connections are located in the forward end of the closure, the individual wires 71 extend in the direction of the flow of encapsulant, thus not hindering or obstructing such flow. As the top shell of the closure is further rotated about living hinge toward bottom shell 14, the encapsulant continues to be urged towards the forward end of the closure. In this manner, i.e., by initially displacing the encapsulant located in the rearward end of the closure and thereafter pushing the encapsulant forward towards the forward end of the closure, every interior region of the closure is filled with encapsulant. Inasmuch as the individual splices are located at the forward end of the closure, the closing of the box and continuous pushing forward of the encapsulant contained therein ensures that the individual splices are fully encapsulated within the encapsulant when the closure is finally closed. As mentioned above, the closure may include pressure release holes 70 to allow excess encapsulant to extrude therefrom, particularly in applications utilizing a paste encapsulant.

In one preferred embodiment, the shells include walls having a height H. The shells are configured such that at least one of the shells telescopes within the other shell at least one-half the height of the wall of the one shell to provide an encapsulant-displacing force.

It will be recognized that by locating the cable entrances proximate the living hinge, the encapsulant will be "pushed" forward as the closure is moved from an open position to a closed position as the encapsulant contained in the top shell initially contacts cable 24. Because the two shells are telescoping within one another, the encapsulant in the top shell is displaced as it first contacts cable 24 (i.e., the cable located closer to living hinge 16). It will be appreciated that the cables fill a substantial volume of space when positioned in the bottom shell, which causes displacement of the encapsulant when the encapsulant is pressed against such cables. Inasmuch as living hinge is continuous across the rearward end of the closure, an encapsulant flow barrier is created which prevents rearward flow of encapsulant. As the shells are further closed, the encapsulant of the top shell then contacts cable 26. Because the rearward end of the closure is already filled, the encapsulant continues to be urged forward toward the splice connection located in the forward end of the closure.

The elongate shape of the closure facilitates the channeling of the channeling of the encapsulant forward. Inasmuch as the splice connections are located in the forward end of the closure, sufficient encapsulant will be urged toward such end to fully encapsulate each and every splice position therein. It will be further appreciated that the full telescoping configuration of the closure of the present invention ensures that encapsulant will be urged into all interior regions of the closure, such urging of the encapsulant beginning at the rearward region of the closure (proximate the living hinge) and moving forward as the top shell is moved from the open position to the fully closed position. This displacement is facilitated by the rotational contact of the encapsulant and the interiorly-located components of the splice, which is in direct contrast to the substantially perpendicular contact created in prior art two-piece closures. Because of the proximity of cable relief passage 46 to living hinge 16, a portion thereof, i.e., edge 78 shown in FIG. 4a, may be chamfered to facilitate rotation of top shell 12 with respect to bottom shell 14.

Figure 4C:
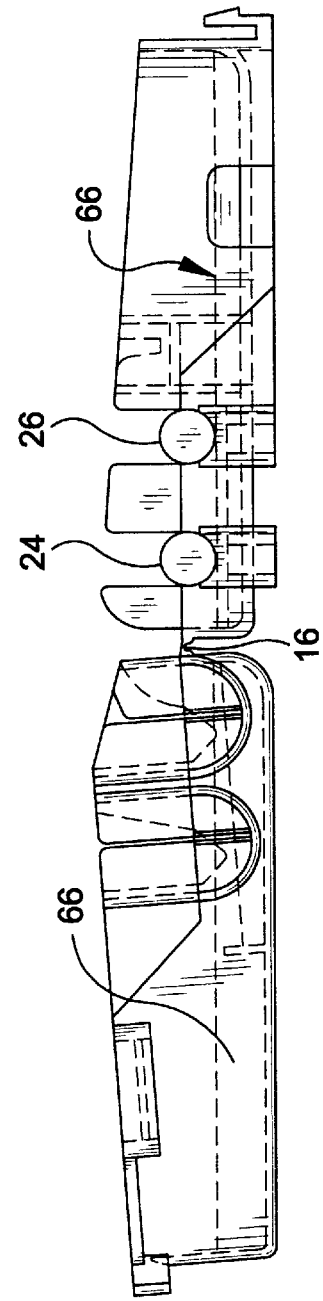
FIG. 4c is a side elevational view of the closure of the present invention prefilled with a gel encapsulant.

As shown in FIG. 4c, each shell of the closure may be initially filled with encapsulant 66. When utilizing the gel encapsulant of FIG. 4c and prefilling each shell, the shell is filled to a lesser extent than when paste encapsulant of FIG. 4a is added to a single shell, i.e., top shell 12. This is illustrated by the dashed lines of FIGS. 4a and 4c which indicate the initial height of the encapsulant.

Figure 6:
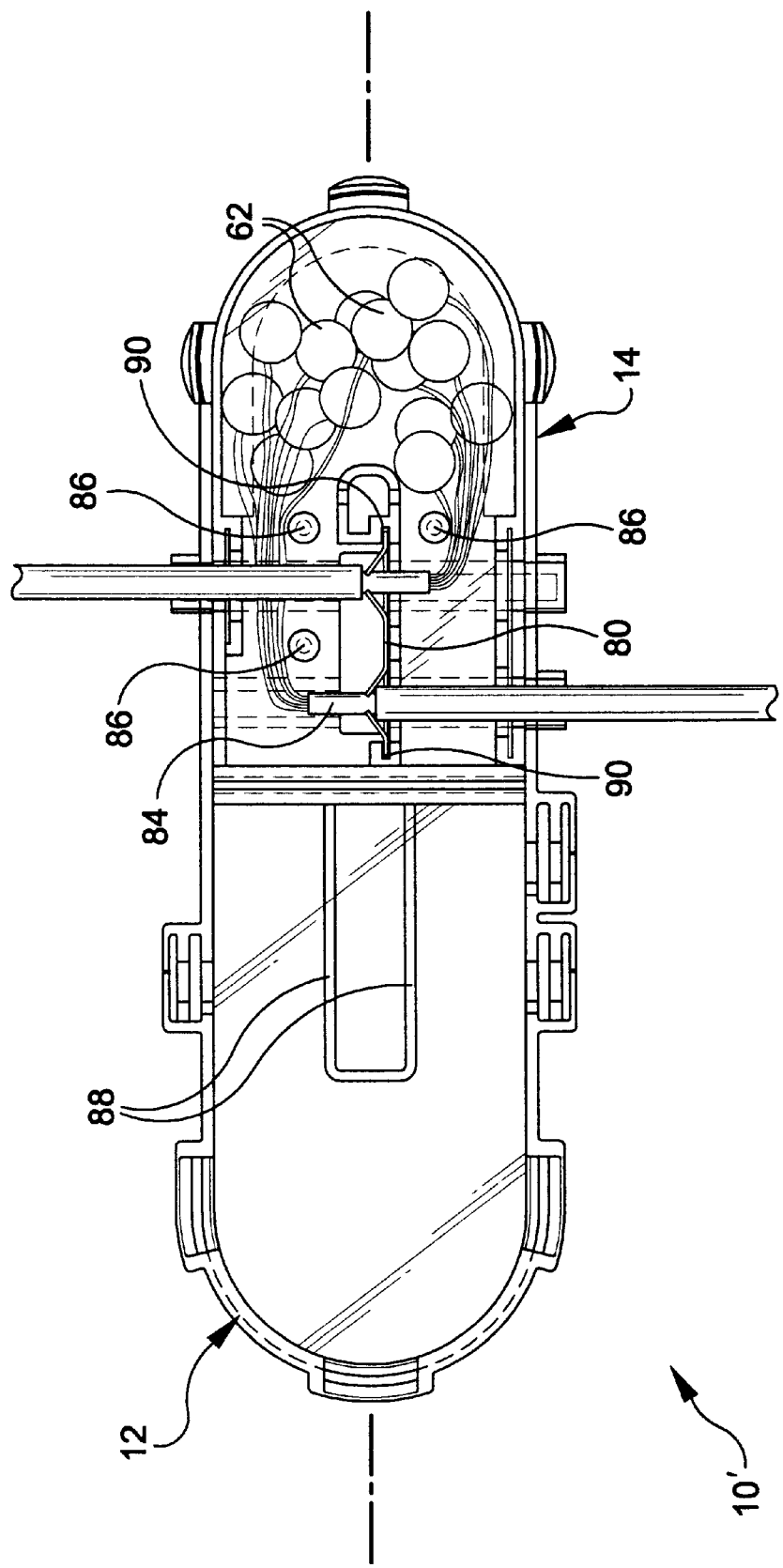
FIG. 6 is a plan view illustrating an in-line splice in the closure of FIG. 5.
Figure 7A:
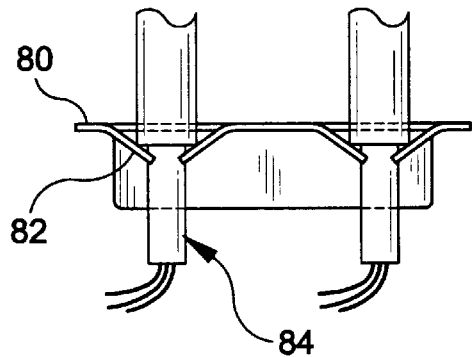
FIGS. 7a–7b are enlarged details of the grounding clip utilized in the closure of FIGS. 5–6.
Figure 7B:
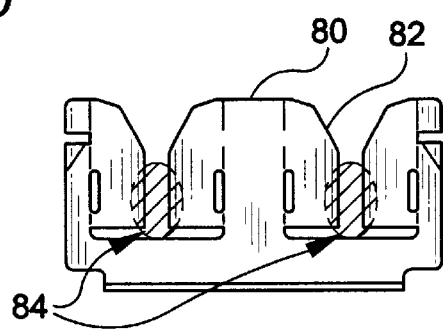
Figure 7C:
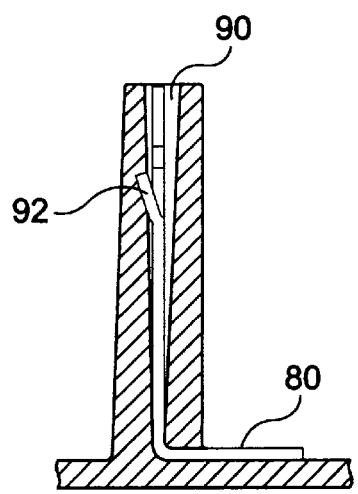
FIG. 7c is an enlarged detail showing the engagement of the grounding clip of FIGS. 7a–7b with the bottom shell of the closure of FIGS. 5–6.

An alternative closure, i.e., closure 10', is shown in FIGS. 5–6. Closure 10' utilizes a common grounding clip 80 to electrically interconnect the ground shields of the respective cables. Grounding clip 80 is shown in detail in FIGS. 7a–7b. In this regard, clip 80 includes wing tabs 82 which flex as necessary to bite into and create an electrical contact with the grounding shield of the cable, i.e., grounding shield 84. Closure 10', together with grounding clip 80, may be used to splice electrical cable in a butt configuration (as shown in FIG. 5) or in an in-line configuration (as shown in FIG. 6). In each configuration, the individual splices are stowed in the forward end of the closure, with the individual wires extending in the direction of flow of the encapsulant.

Closure 10' preferably includes a plurality of posts 86 to facilitate guiding wires to the forward end of the closure. Closure 10' may also include hold down ribs 88 to ensure that the cables remain secured within grounding clip 80 when the closure is in the closed position. Closure 10' is preferably formed with opposing clip receiving slots 90 for receipt of the grounding clip 80 therein. Additionally, clip 80 may include a barb 92 for engaging the sidewalls of slot 90. It will be appreciated that one common grounding clip can be utilized for either a butt splice or an in-line splice.

Figure 8:
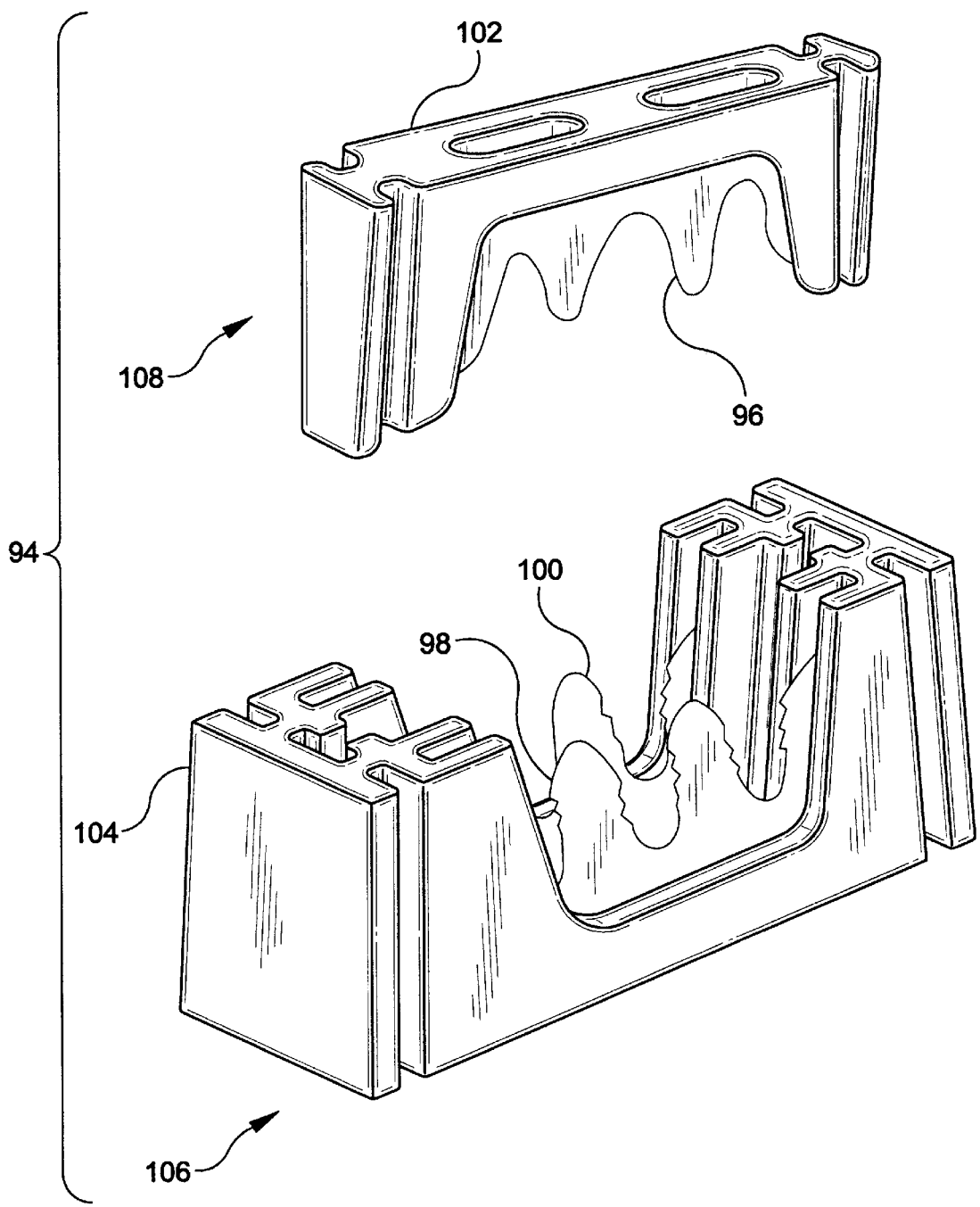
FIG. 8 is a perspective view of a splice block connector which may be assembled exteriorly of the closure.

In another embodiment of the present invention, the closure utilizes a cable strain relief/shield connector 94 (see FIG. 8) which preferably uses three flat stamped conductive metal parts 96, 98, 100, each having three distinct cut-outs or slots. The three stamped parts are contained in two mating holders 102, 104. The holders are preferably plastic and configured in a male/female arrangement. In use, these three stamped parts provide the cable shield connection and cable strain relief for the connector. The two holders are designed to contain and control the stamped parts while assembling the splice connections.

Connector 94 allows the cable shield connection and strain relief to be assembled prior to inserting the cables into the splice case. This offers the craftsmen a more flexible work arrangement and minimizes the time spent making contact with the splice encapsulant. The connector, once assembled, provides a "splice block" that can be located in a specific place in the closure. This design provides a means of structurally integrating the strength of the assembled splice connector into the closure, thereby increasing the strength of the closure. Once located in the closure, the splice block will not move with respect to the encapsulant and thus compromise splice integrity.

Figure 9A:
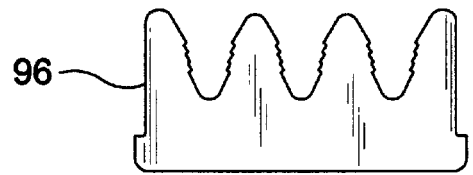
FIGS. 9a–9c are details of the male connector half of the splice block of FIG. 8.
Figure 9B:
Figure 9C:
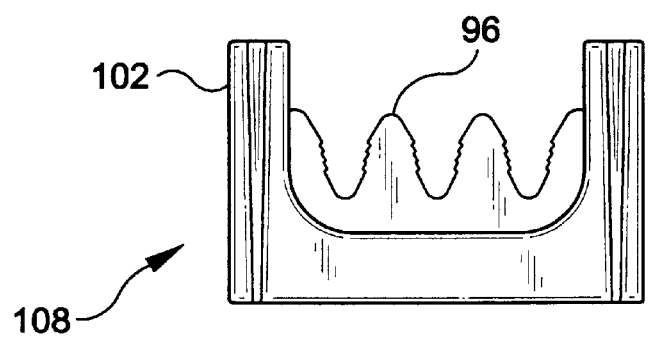
Figure 11A:
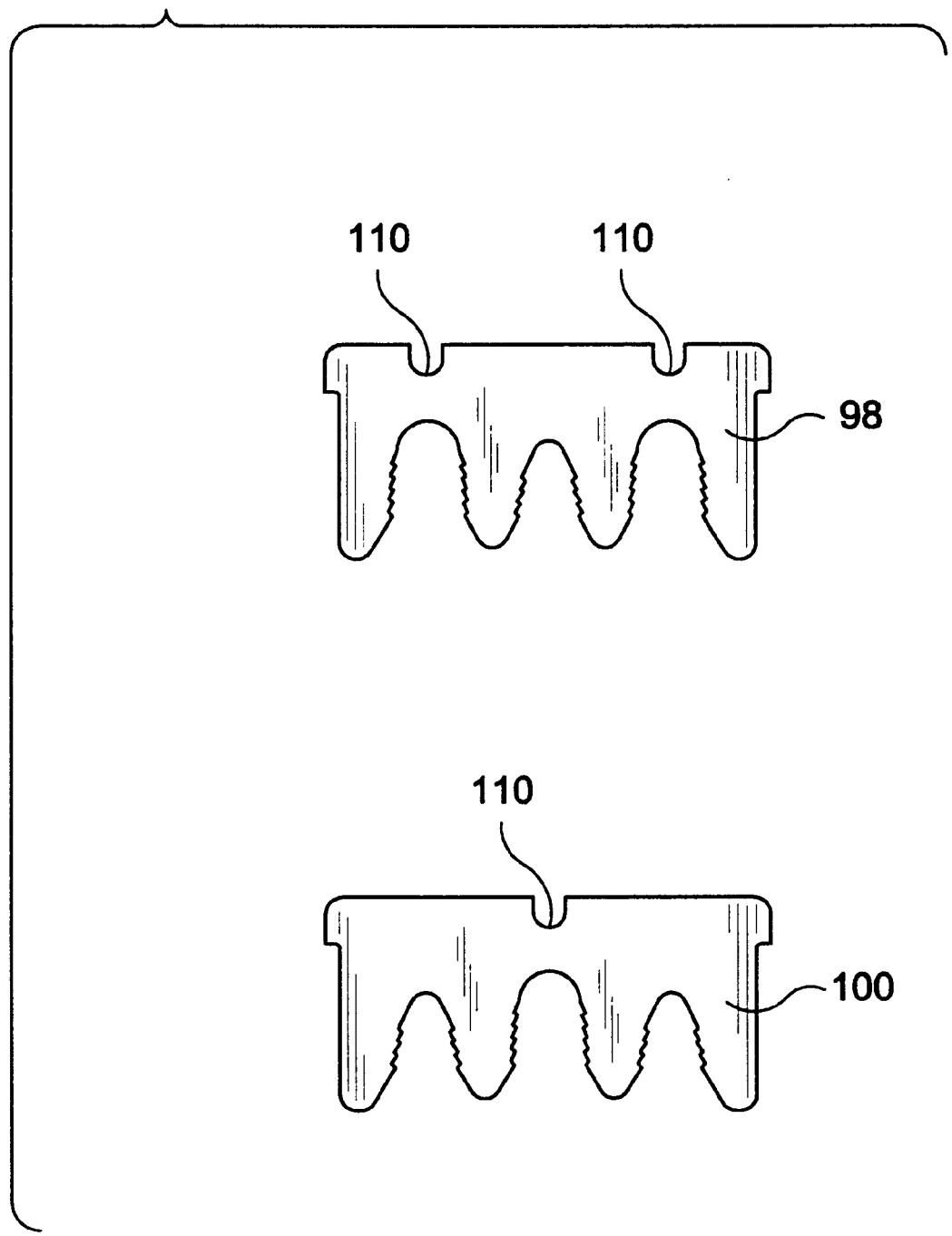
FIGS. 11a–11c are details of the female connector half of the splice block of FIG. 8.
Figure 11B:
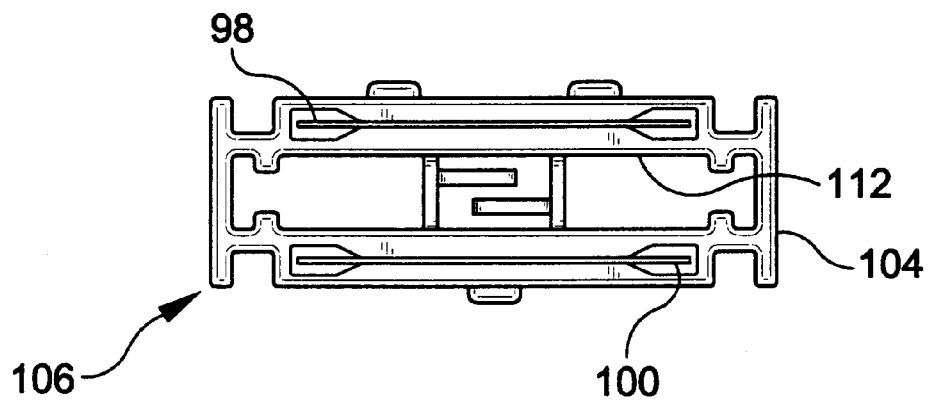
Figure 11C:
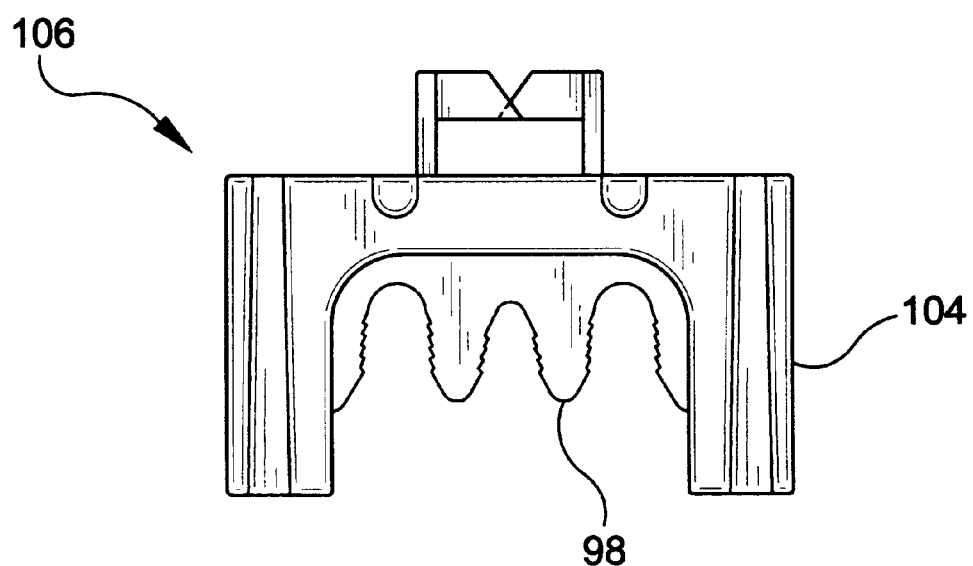

Connector 94, which provides cable shield connection and cable strain relief for buried service wire splices used in the telephone industry, preferably uses an arrangement of two plastic mating holders having a total of three conductive metal stampings. Each of the three conductive metal stamping "blades" are unique having a distinct pattern of three cut-outs or notches in them, sized and shaped for their individual function. One mating shell of the connector, i.e., holder 102, contains one distinct metal stamped part, i.e., part 96 (see FIGS. 9a–9c). The opposite mating shell, holder 104, contains two other distinct metal stamped parts, i.e., metal parts 98, 100 (see FIGS. 11a–11c).

Figure 10:
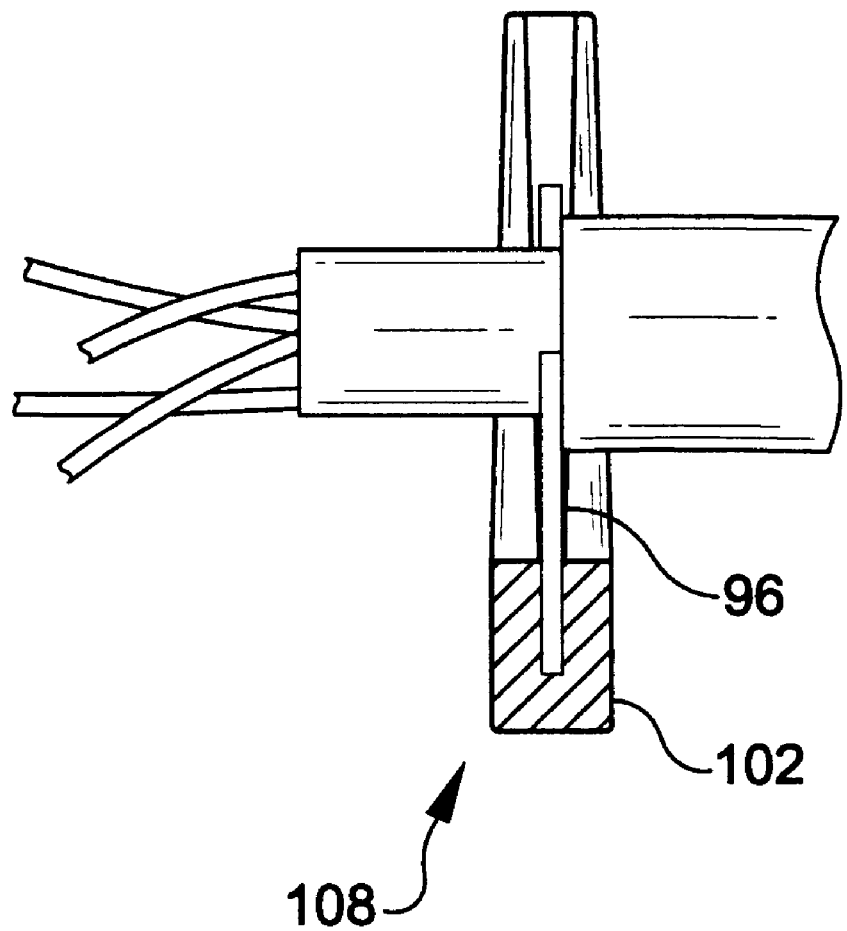
FIG. 10 is a sectional view showing the male connector half engaging a grounding shield of an electrical cable.
Figure 12:
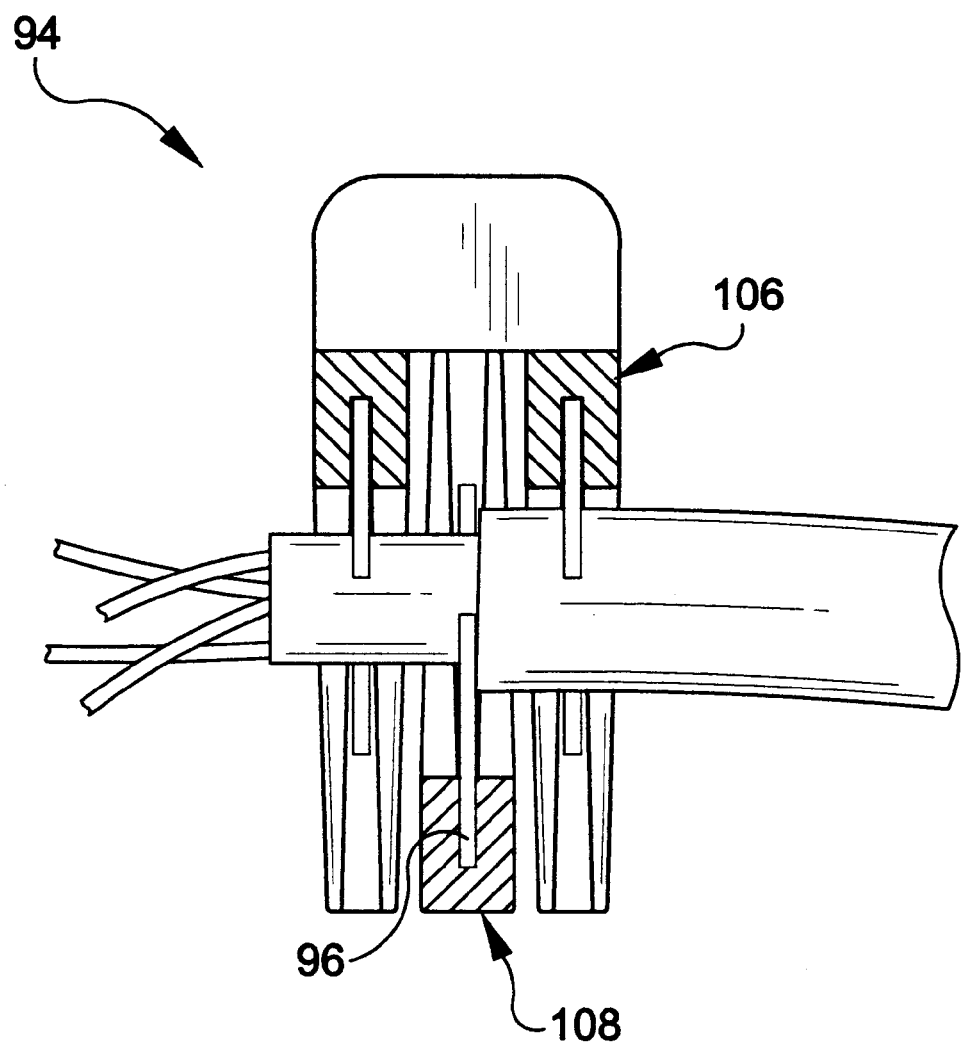
FIG. 12 is a sectional view of the splice block of FIG. 8 in engagement with both the grounding shield and sheath of an electrical cable.
Figure 13A:
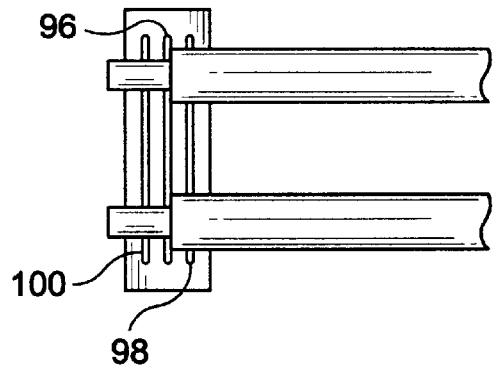
FIG. 13a illustrates a butt connection utilizing the splice block of FIG. 8.
Figure 13B:
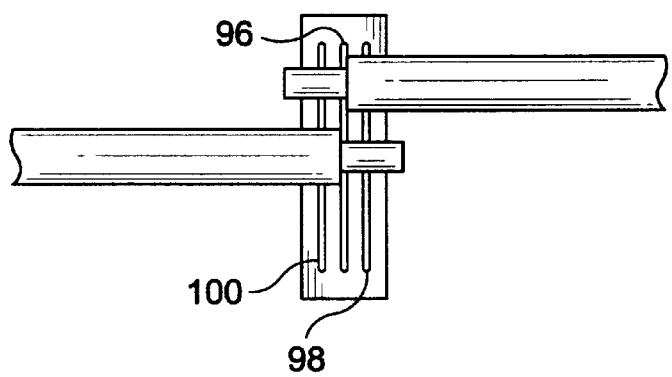
FIG. 13b illustrates an in-line splice utilizing the splice block of FIG. 8.
Figure 13C:
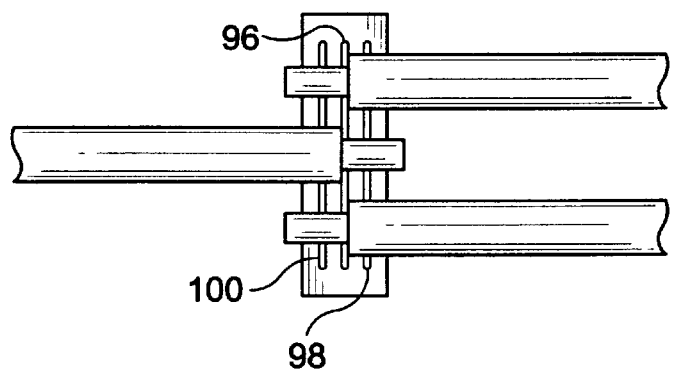
FIG. 13c illustrates a three-way splice utilizing the splice block of FIG. 8.

The single center blade connector shell, i.e., holder 102, is used first during splice assembly. The single stamped conductive metal part 96 it contains preferably has three cut-outs of equal size and configuration to grip onto the exposed cable shield of up to three different cables. This provides "grounding" for the cable shield. Each individual cable shield is pushed down into the notched cut-outs of the connector "blade". The cable jackets are located flush to the connector "blade". (See FIG. 10). The holder is shaped to mate with and slide within dual blade holder, i.e., holder 104 (see FIGS. 8 and 12).

The dual blade holder is used second during the splice assembly. It contains conductive metal stampings 98 and 100, each having a distinct pattern of three cutouts or notches in them, sized and shaped for their individual function. One stamping, i.e., stamping 98, is designed to grip and secure a central cable shield and cable jackets on either side. The second of the pair of stampings, i.e., stamping 100, is designed to grip and secure one central cable jacket and two cable shields on either side. These cut-outs provide both shield "grounding" and strain relief to the splice block. Identification notches 110 are provided on the stamped parts to aid in manufacturing. These identification notches match projections on the holder. Connector half 106 (which includes holder 104 and stampings 98, 100) is preferably shaped to mate with and receive connector half 108 (which includes holder 102 and stamping 96) within channel 112.

Once assembled, connector 94 provides three (3) positive gripping contact points on each of the up to three cables used in the splice connection. Each cable is gripped once on the cable jacket and twice on the cable shield (see FIG. 12). In use, connector 94 allows for the construction of three types of service wire splices: (1) inline; (2) three-way; and (3) butt splice (see FIG. 14) within one common assembly.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included within the scope of the followings claims.

What is claimed is:

1. A closure for receipt and storage of a plurality of splice connections and encapsulant, comprising:

first and second cooperating shells defining a bounded region and being telescopically engageable with one another;

a living hinge for connecting said first and second shells, said hinge extending continuously across at least one side of each of said shells thereby defining an axis about which said shells rotate with respect to one another and providing an encapsulant-flow barrier along said living hinge, said hinge located to allow one of said shells to telescope within the other of said shells when said shells are rotated from an open position to a closed position thus providing an encapsulant-displacing force which continuously directs said encapsulant contained within said bounded region away from said living hinge while simultaneously retaining said encapsulant within said bounded region;

at least two passages extending through said shells and communicating with said bounded region whereby electrical cable may be passed therethrough; and securing means for retaining said shells in said closed position.

2. The closure according to claim 1, wherein said shells include walls having a height H and wherein said shells are configured such that one of said shells telescopes within the other of said shells at least one-half the height of said walls of said one shell to provide said encapsulant-displacing force.

3. The closure according to claim 2, wherein said one of said shells telescopes within the other of said shells substantially the entire height of said walls of said one shell whereby the overall height of said closure in said closed position is substantially equal to the height of the individual shells.

4. The closure according to claim 1, wherein each of said shells has a length L and a width W wherein L is greater than W, each of said shells further including walls extending along both said length and said width thereby defining said bounded region, said bounded region adapted for receipt of said encapsulant, and wherein said splice connections are located in an end of said bounded region opposite said living hinge.

5. The closure according to claim 1, wherein said second shell telescopes within said first shell, and wherein said passages include at least two cable entrances formed in said second shell, and further comprising at least one strain relief clip secured to said second shell and located to cooperate with said cable entrances whereby the electrical cable passing therethrough is gripped by said strain relief clip.

6. The closure according to claim 5, wherein said strain relief clip includes a slot sized for receipt of the cable and further includes a plurality of teeth thereabout configured to bite into an outer sheath of the electrical cable.

7. The closure according to claim 1, wherein said second shell includes opposing first and second sidewalls, and wherein said second shell telescopes within said first shell, and wherein said passages include first and second cable entrances located on said first sidewall of said second shell and a third cable entrance located on said second sidewall of said second shell, and further comprising strain relief clips located to cooperate with said cable entrances whereby the electrical cable passing therethrough is gripped by said clips.

8. The closure according to claim 7, wherein said cable entrances are located proximate said living hinge, and wherein said splice connections are located within said bounded region and are distally spaced from said cable entrances in a direction extending away from said living hinge.

9. The closure according to claim 8, wherein said first shell includes opposing first and second sidewalls and further includes first and second cable relief passages located on said first sidewall and positioned to cooperate with said first and second cable entrances located on said second shell, and wherein said first shell further comprises a third cable relief passage located on said second sidewall and adapted to cooperate with said third cable entrance on said second shell when said shells are rotated to said closed position, and wherein said first shell further includes temporary barriers for closing said cable relief passages prior to rotation of said shells to said closed position.

10. The closure according to claim 9, wherein said shells and said living hinge are integrally molded from an impact-resistant plastic.

11. The closure according to claim 10, wherein said impact-resistant plastic is polypropylene.

12. The closure according to claim 11, further comprising a cable support platform located externally to said second shell and proximate each of said cable entrances.

13. A closure for receipt and storage of a plurality of splice connections and encapsulant, comprising:

first and second cooperating shells, each of said shells including sidewalls defining a bounded region and being telescopically engageable with one another to provide a closed internally located storage site; and a living hinge for connecting said first and second shells, said hinge located as to allow one of said shells to telescope within the other of said shells when said shells are rotated between an open position which provides access to said bounded regions and a closed position which encloses said bounded regions to provide said storage site, each of said shells including a forward end opposite said living hinge and wherein one of said shells telescopes within the other shell at least one-half the height of said sidewalls of said one shell thus providing an encapsulant-displacing force with continuously directs encapsulant away from said living hinge and said forward end of said storage site.

14. The closure according to claim 13, wherein said one of said shells telescopes within the other shell substantially all of the height of said sidewalls of said one shell whereby the height of said closure in said closed position is substantially equal to the height of the individual shells.

15. A closure for receipt and storage of a plurality of splice connections within an encapsulant, comprising:

first and second cooperating shells, each of said shells having a length L and a width W wherein L is greater than W, each of said shells further including sidewalls extending along both said length and said width thereby defining a bounded region for receipt of said encapsulant, a living hinge for connecting said first and second shells, said hinge located on said sidewalls extending along said width; and each of said shells having a rearward end located proximate to the living hinge and a forward end located opposite said rearward end, said forward end sized for receipt of said plurality of splice connections therein, said shells including passages adapted to allow a length of electrical cable to communicate with said bounded region, said passages being located on said sidewalls extending along said length and positioned proximate to said hinge whereupon rotation of said shells about said hinge provides an encapsulant displacing force which continuously directs said encapsulant from said rearward end of said shell to said forward end whereby said splice connections contained within said forward end are encapsulated.

16. The closure according to claim 15, wherein said shells are formed with an elongate configuration which channels said encapsulant towards said forward end during rotation of said shells from an open position to a closed position.

17. An assembly, comprising:

a closure for receipt and storage of splice connections and encapsulant; and a splice block sized for placement within said enclosure and providing common grounding and strain relief capabilities for multiple electrical cables, said block including:

a first clip having multiple receiving slots, each of said slots configured to both secure and electrically contact a length of a grounding shield fitted therewithin;

a first clip holder for supporting said first clip in a predetermined orientation;

second and third clips, each including at least one sheath-receiving slot and at least one grounding shield-receiving slot;

a second clip holder for supporting said second and third clips in a substantially coplanar orientation, and wherein said first and second clip holders are configured to mate with one another whereby said first clip may be located between said second and third clips and oriented substantially coplanar therewith following engagement of said first clip with the grounding shields of the electrical cables.

18. The assembly according to claim 17, wherein said first clip includes three receiving slots each configured to both secure and electrically contact the length of the grounding shield fitted therewithin, and wherein said second clip includes two cable strain relief slots and one centrally-positioned grounding shield-receiving slot, and wherein said third clip includes one centrally-positioned strain relief slot and two grounding shield-receiving slots located on opposing sides thereof whereby said splice block allows the assembly of in line splices, butt splices and three-way splices.

* * * * *

UNITED STATES PATENT AND TRADEMARK OFFICE
CERTIFICATE OF CORRECTION

PATENT NO. : 6,111,201
DATED : August 29, 2000
INVENTOR(S) : Drane, et al.

It is certified that error appears in the above-identified patent and that said Letters Patent is hereby corrected as shown below:

Column 1, line 62,   now reads "is filly";

should read --is fully-; and

Column 6, lines 8-9,   now reads "channeling of the channeling of the encapsulant";

should read --channeling of the encapsulant--.

Signed and Sealed this

First Day of May, 2001

Attest:

NICHOLAS P. GODICI

Attesting Officer    Acting Director of the United States Patent and Trademark Office